(12) United States Patent
Wang et al.

(10) Patent No.: US 11,383,237 B2
(45) Date of Patent: Jul. 12, 2022

(54) MICROFLUIDIC DEVICE, DRIVING METHOD AND MICROFLUIDIC DETECTION SYSTEM

(71) Applicant: BOE TECHNOLOGY GROUP CO., LTD., Beijing (CN)

(72) Inventors: Wei Wang, Beijing (CN); Xianqin Meng, Beijing (CN); Xiandong Meng, Beijing (CN); Jifeng Tan, Beijing (CN); Pengxia Liang, Beijing (CN); Jian Gao, Beijing (CN); Fangzhou Wang, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 312 days.

(21) Appl. No.: 16/618,381

(22) PCT Filed: Mar. 27, 2019

(86) PCT No.: PCT/CN2019/079845
§ 371 (c)(1),
(2) Date: Dec. 1, 2019

(87) PCT Pub. No.: WO2019/228035
PCT Pub. Date: Dec. 5, 2019

(65) Prior Publication Data
US 2021/0354130 A1    Nov. 18, 2021

(30) Foreign Application Priority Data
May 30, 2018    (CN) .......................... 201810540679.1

(51) Int. Cl.
*B01L 3/00*    (2006.01)
*G01N 21/47*    (2006.01)
*G01N 21/552*    (2014.01)

(52) U.S. Cl.
CPC ........ *B01L 3/502715* (2013.01); *G01N 21/47* (2013.01); *G01N 21/552* (2013.01);
(Continued)

(58) Field of Classification Search
CPC .. B01L 3/502715; B01L 3/5027; B01L 3/502; B01L 3/50; B01L 2200/0689;
(Continued)

(56) References Cited

U.S. PATENT DOCUMENTS 5,455,178 A    10/1995   Fattinger
6,331,274 B1 *  12/2001  Ackley ................ B01L 3/5027
                                                257/E21.43
(Continued)

FOREIGN PATENT DOCUMENTS

CN    102954938 A    3/2013
CN    103424554 A    12/2013
(Continued)

OTHER PUBLICATIONS

First Office Action for Chinese Application No. 201810540679.1, dated Jan. 15, 2020, 7 Pages.
(Continued)

*Primary Examiner* — Christine T Mui
(74) *Attorney, Agent, or Firm* — Brooks Kushman P.C.

(57) ABSTRACT

The present disclosure discloses a microfluidic device, a driving method and a microfluidic detection system. The microfluidic device includes: a substrate; two first optical waveguides disposed opposite each other on the substrate with an accommodating chamber defined between the two first optical waveguides; and a plurality of optical detection structures in the accommodating chamber. The first optical waveguide has a refractive index greater than a refractive index of a medium surrounding the first optical waveguide, thereby enabling light rays incident into an end of the first
(Continued)

optical waveguide to propagate towards another end of the first optical waveguide in a total reflection mode.

16 Claims, 4 Drawing Sheets

(52) U.S. Cl.
 CPC ................ *B01L 2200/0689* (2013.01); *B01L 2300/0645* (2013.01); *B01L 2400/0415* (2013.01); *B01L 2400/0478* (2013.01)

(58) Field of Classification Search
 CPC ......... B01L 2200/06; B01L 2300/0645; B01L 2300/06; B01L 2400/0415; B01L 2400/0478; G01N 21/47; G01N 21/552
 USPC .......................................... 422/502, 500, 50
 See application file for complete search history.

(56) References Cited

U.S. PATENT DOCUMENTS

| | | | | |
|---|---|---|---|---|
| 8,173,077 | B2 * | 5/2012 | Korampally | ........... C12Q 1/686 422/500 |
| 2012/0088230 | A1 | 4/2012 | Givens et al. | |
| 2013/0309779 | A1 | 11/2013 | Kasai et al. | |
| 2015/0177125 | A1 | 6/2015 | Kasai | |
| 2015/0300943 | A1 | 10/2015 | Jardinier et al. | |
| 2020/0108387 | A1 | 4/2020 | Dong et al. | |

FOREIGN PATENT DOCUMENTS

| | | |
|---|---|---|
| CN | 104729993 A | 6/2015 |
| CN | 104853844 A | 8/2015 |
| CN | 105413765 A | 3/2016 |
| CN | 107478607 A | 12/2017 |
| CN | 107607475 A | 1/2018 |
| CN | 107991263 A | 5/2018 |
| CN | 109765178 A | 5/2019 |
| JP | 2005140683 A | 6/2005 |
| JP | 2007511750 A | 5/2007 |
| TW | 201305548 A | 2/2013 |

OTHER PUBLICATIONS

International Search Report and Written Opinion for Application No. PCT/CN2019/079845, dated Jun. 25, 2019, 11 Pages.

Choi et al., "A Guiding Light: Spectroscopy on Digital Microfluidic Devices Using In-plane Optical Fibre Waveguides," Analytical and Bioanalytical Chemistry, Aug. 2, 2015, pp. 7467-7475, vol. 407, Springer-Verlag Berlin Heidelberg, 9 Pages.

Saavedra et al., "Integrated Optical Attenuated Total Reflection Spectrometry of Aqueous Superstrates Using Prism-Coupled Polymer Waveguides," Analytical Chemistry, Oct. 15, 1990, vol. 62, No. 20, pp. 2251-2256, American Chemical Society, 6 Pages.

Valentino et al., "Microfluidic Detection and Analysis by Integration of Evanescent Wave Sensing with Thermocapillary Actuation," Technical Digest of the 18th IEEE International Conference of Micro Electro Mechanical Systems, Jan. 30-Feb. 3, 2005, pp. 770-773, vol. 18, Princeton University, Princeton, NJ, USA, 4 Pages.

* cited by examiner

MICROFLUIDIC DEVICE, DRIVING METHOD AND MICROFLUIDIC DETECTION SYSTEM

CROSS-REFERENCE TO RELATED APPLICATION

This application is the U.S. national phase of PCT Application No. PCT/CN2019/079845 filed on Mar. 27, 2019, which claims priority to Chinese Patent Application No. 201810540679.1 filed on May. 30, 2018, which are incorporated herein by reference in their entireties.

TECHNICAL FIELD

The present disclosure relates to the field of sensing and biological detection technologies, in particular to a microfluidic device, a driving method and a microfluidic detection system.

BACKGROUND

With increasing requirements for detection in the field of biomedicine, higher requirements are put forward for microfluidic chips in microfluidic detection systems in accurate measurement and regulation of droplets.

SUMMARY

One embodiment of the present disclosure provides a microfluidic device including: a substrate; two first optical waveguides disposed opposite each other on the substrate with an accommodating chamber defined between the two first optical waveguides; and a plurality of optical detection structures in the accommodating chamber. The first optical waveguide has a refractive index greater than a refractive index of a medium surrounding the first optical waveguide, thereby enabling light rays incident into an end of the first optical waveguide to propagate towards another end of the first optical waveguide in a total reflection mode.

Optionally, a plurality of grooves is defined in a surface of the substrate; the plurality of optical detection structures are disposed in the plurality of grooves in a one-to-one manner.

Optionally, the microfluidic device further includes a plurality of light coupling structures which are disposed in the plurality of grooves and corresponding to the plurality of optical detection structures in a one-to-one manner; and the optical detection structure is located at one side of the light coupling structure corresponding to the optical detection structure distal to the first optical waveguide.

Optionally, the light coupling structure is a grating or scattering particles in the groove.

Optionally, the accommodating chamber is a channel defined by the two first optical waveguides on the substrate; the end of the first optical waveguide is a liquid inlet region of the channel; and the another end of the first optical waveguide is a liquid outlet region of the channel.

Optionally, the two first optical waveguides each are a strip-shaped structure and are parallel to each other.

Optionally, the channel has a bottom; and orthographic projections of the plurality of optical detection structures onto a plane where the bottom is located, are arranged along a center line of the bottom.

Optionally, the microfluidic device further includes a light coupling-in structure; and the light coupling-in structure is disposed at the end of the first optical waveguide and configured to couple incident light rays into the first optical waveguide.

Optionally, the light coupling-in structure is a scattering hole or a grating disposed in the end of the first optical waveguide.

Optionally, the microfluidic device further includes another substrate disposed opposite to the substrate, the two first optical waveguides are between the substrate and the another substrate; and a size of the another substrate is smaller than a size of the substrate with the and the another end of the first optical waveguide being exposed out.

Optionally, a first electrode is disposed on a surface of the substrate, and a second electrode is disposed on a surface of the another substrate. The first electrode includes a plurality of sub-electrodes, the plurality of sub-electrodes are corresponding to positions of the plurality of optical detection structures in a one-to-one manner; and the sub-electrode is located between the optical detection structure corresponding to the sub-electrode and the light coupling structure corresponding to the optical detection structure which is corresponding to the sub-electrode.

Optionally, the microfluidic device further includes two second optical waveguides disposed between the two first optical waveguides, one of the two second optical waveguides is located at one end of the channel and the other of the two second optical waveguides is located at the other end of the channel; the two second optical waveguides are integrally formed with the first optical waveguides thereby forming the accommodating chamber.

One embodiment of the present disclosure provides a microfluidic detection system including: the above microfluidic device; and a calculation circuit coupled to the optical detection structures of the microfluidic device and configured to calculate a liquid parameter of liquid in the accommodating chamber according to light rays acquired by the optical detection structures.

Optionally, the microfluidic detection system further includes a light source disposed at an end of the first optical waveguide of the microfluidic device.

One embodiment of the present disclosure provides a method for driving the above microfluidic device including: driving liquid to flow into the accommodating chamber; controlling light rays to enter the first optical waveguide at an end of the first optical waveguide; wherein the light rays propagate towards another end of the first optical waveguide in a total reflection mode; when the light rays travel to a position corresponding to the liquid, at least some of the light rays emit from the first optical waveguide and are incident into the liquid; and detecting light rays emitted from the liquid.

Optionally, the microfluidic device further includes another substrate disposed opposite to the substrate; a first electrode is disposed on a surface of the substrate, and a second electrode is disposed on a surface of the another substrate; the method includes: generating a driving electric field for controlling positions of the liquid in the accommodating chamber by applying voltages to the first electrode and the second electrode.

Optionally, the method further includes controlling positions of the liquid in the accommodating chamber by using a microfluidic pump.

BRIEF DESCRIPTION OF THE DRAWINGS

In order to illustrate technical solutions according to embodiments of the present disclosure or in the related art more clearly, drawings to be used in the description of the related art or the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

Figure 1:
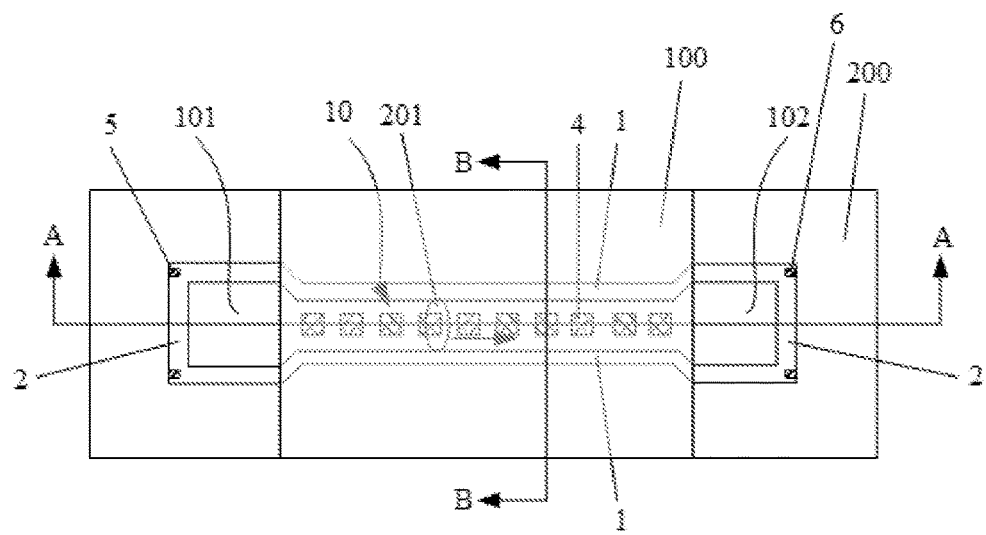
FIG. 1 is a first schematic view of a microfluidic device according to an embodiment of the present disclosure.
Figure 2:
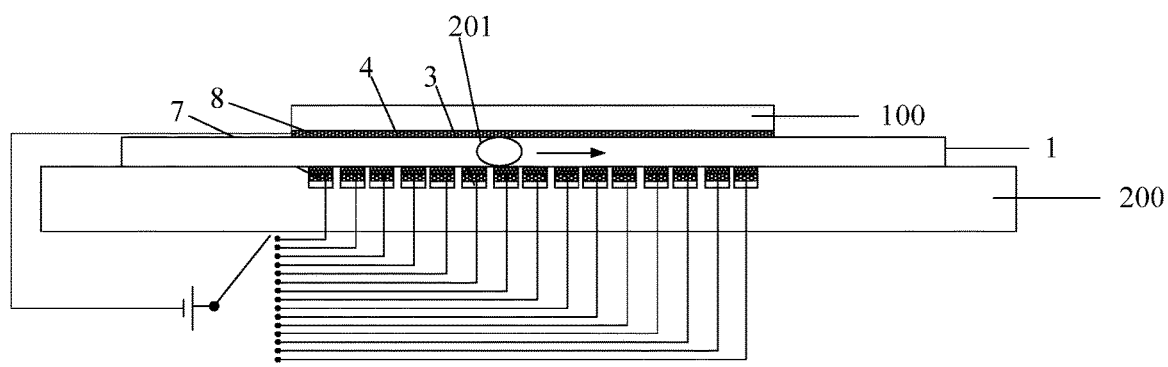
FIG. 2 is a cross-sectional view of FIG. 1 taken along a line A-A.
Figure 3:
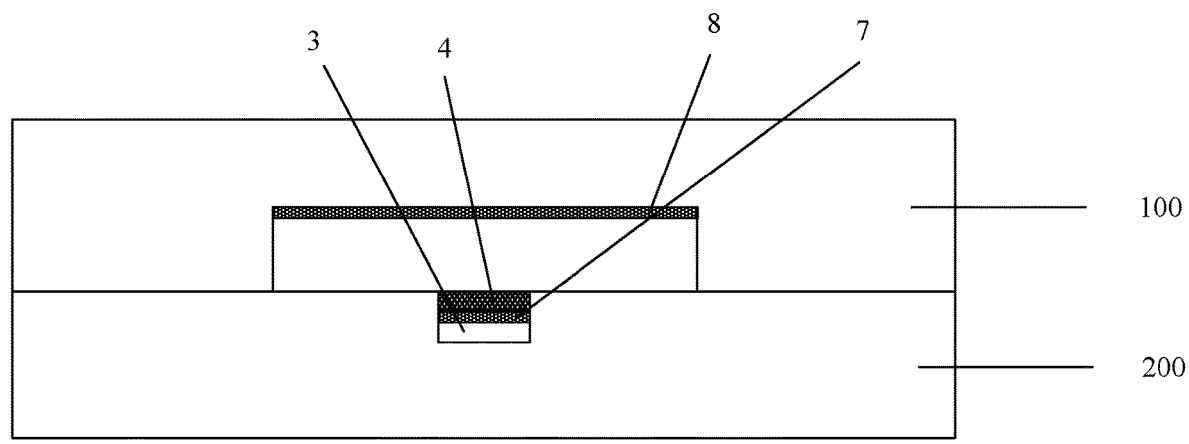
FIG. 3 is a cross-sectional view of FIG. 1 taken along a line B-B.

Microfluidic devices in the related art cannot detect position parameters of liquid, and controlling of the liquid is completely dependent on an external microfluidic pump (or other microfluidic driving system). With increasing requirements for detection, the microfluidic devices are required to be improved in accurate measurement and control of liquids.

In order to solve the above technical problems, one embodiment of the present disclosure provides a microfluidic device. The microfluidic device includes a lower substrate and an optical waveguide device such as at least two optical waveguides disposed on the lower substrate. The optical waveguides define an accommodating chamber on a surface of the lower substrate. The accommodation chamber can accommodate a liquid. The liquid in the accommodating chamber is a to-be-detected liquid, which may be a droplet or a liquid column extending for a distance.

The optical waveguide includes a first optical waveguide. The first optical waveguide has a refractive index greater than a refractive index of a medium surrounding the first optical waveguide, thereby enabling light rays entering the first optical waveguide at a light incident region to propagate in a direction towards a light exiting region in total reflection mode in the first optical waveguide. The light incident region is at an end of the first optical waveguide. The light exiting region is at an opposite end of the first optical waveguide.

The microfluidic device further includes a plurality of optical detection structures on the surface of the lower substrate. The optical detection structures are in the accommodating chamber, and configured to detect light rays emitted from the liquid.

In the above technical solution, the microfluidic device includes two optical waveguides that define an accommodating chamber on the surface of the substrate, and the accommodation chamber can accommodate a liquid. At least one of the optical waveguides has a refractive index greater than a refractive index of a medium surrounding the optical waveguide, thereby forming an optical waveguide structure, and then enabling light rays entering the optical waveguide at the light incident region to propagate in the direction towards the light exiting region in total reflection mode in the first optical waveguide. If there is a liquid in the accommodation chamber, when the light rays in the optical waveguide travel to a position corresponding to the liquid, the light rays are not totally reflected at an interface between the optical waveguide and the liquid, and some of the light rays enters the liquid. The light rays entering the liquid are scattered by the liquid and then emitted around. The optical detection structures disposed on the surface of the substrate can detect light rays emitted from the liquid, thereby achieving higher requirements for detection and regulation according to distribution of the emitted light rays.

The specific principle of one embodiment of the present disclosure is that the first optical waveguide is made of high refractive index material, thereby forming an optical waveguide structure and then enabling light rays incident into the first optical waveguide to propagate in the first optical waveguide in a total reflection mode. When there is a liquid droplet in the accommodation chamber, since a refractive index of the liquid is greater than that of gas in the accommodation chamber, light rays travelling in the first optical waveguide are no longer totally reflected at a position corresponding to the liquid in the first optical waveguide and some of light rays enters the liquid. Based on distribution of the emitted light rays, combined with an optical scattering model of the liquid, as well as different intensities of light rays emitted from different positions of the liquid due to different filling degrees of the liquid in the microfluidic channel, liquid parameters of the liquid can be calculated more accurately.

The principle of detecting the position of the liquid may be that a plurality of optical detection structures are provided for detecting light rays emitted from the liquid when the liquid is at different positions. That is, different optical detection structures are used to detect light rays emitted from the liquid when the liquid is at different positions, thus, when each optical detection structure detects light rays emitted from the liquid, the liquid is at a certain corresponding position. In this way, the corresponding position of the liquid can be determined according to one optical detection structure that detects light rays.

Based on the above principles, a time duration in which two adjacent optical detection structures detect light rays emitted from the liquid can be counted, and a flow rate of the liquid can be calculated according to a distance between the two adjacent optical detection structures and the time duration.

Specifically, the plurality of optical detection structures may be disposed on the surface of the lower substrate. For example, a plurality of grooves may be defined in the surface of the lower substrate, and the optical detection structures are disposed in the grooves in a one-to-one manner (i.e., there is one optical detection structure in each groove). This prevents formation of protrusions due to the presence of the optical detection structures in the surface of the lower substrate, and then avoids blocking of the liquid caused by the presence of protrusions.

In order to improve detection sensitivity, the microfluidic device in the present application further includes a plurality of light coupling structures disposed on the surface of the lower substrate. The optical detection structure is located at one side of the light coupling structure distal to the optical waveguide. The light coupling structures are corresponding to the optical detection structures in a one-to-one. The light coupling structures are used to couple light rays emitted from the liquid to the corresponding optical detection structure, thereby increasing light rays projected to the optical detection structure and then improving the detection sensitivity. The light coupling structure couples the light rays by means of scattering or diffraction to cause the light rays to exit in a surrounding/specified direction. For example, the light coupling structure and the optical detection structure may be disposed in a groove in the surface of the lower substrate.

The light coupling structure may be a grating. Depending on the diffraction effect of the grating on light rays, the gating can direct the light rays emitted from the liquid to the optical detection structure, thereby improving detection sensitivity. Of course, the light coupling structure is not limited to the grating. For example, the light coupling structure may be a scattering hole, and the scattering hole may be filled with scattering particles; or, when the optical detection structure is disposed in the groove in the surface of the lower substrate, the light coupling structure may be scattering particles filled in the groove, and the light rays emitted from the liquid can be scattered by the scattering particles and then are emitted around. This facilitates the optical detection structure to acquire light rays emitted from the liquid, thereby improving the detection precision. When the scattering particles are filled, the process is simple. When the gating is provided, it is more precise in controlling angles of light rays with less interference light. A suitable light coupling structure may be selected according to specific needs.

In the present disclosure, the accommodating chamber for accommodating the liquid may be a channel defined in the surface of the lower substrate, and such a structure is simple and is easy to be fabricated. When the optical waveguide includes two first optical waveguides disposed opposite each other, the accommodating chamber is a channel defined between the two first optical waveguides on the surface of the lower substrate. The channel includes a liquid inlet region and a liquid outlet region. The liquid inlet region enables the liquid to flow into the channel, and the liquid outlet region enables the liquid to flow out of the channel. The liquid inlet region may be, but is not limited to, disposed at one end of the channel adjacent the light incident region. The liquid outlet region may be, but is not limited to, disposed at the other end of the channel adjacent the light exiting region. When the liquid in the accommodating chamber is a liquid droplet, the liquid outlet region is mainly used to exhaust gas, and the liquid droplet generally does not flow out. When the liquid in the accommodating chamber is a liquid column extending for a distance, the liquid outlet region is used to exhaust gas, allow the liquid column to flow out, or the like.

The two first optical waveguides may form two optical waveguide structures. When light rays are simultaneously incident into the two first optical waveguides, the intensity of the light rays entering the liquid in the channel is increased, and the detection sensitivity of the liquid can be improved.

In some embodiments, orthographic projections of the plurality of optical detection structures onto a plane where the bottom of the channel is disposed, is on a center line of the bottom of the channel, and is substantially corresponding to a center of the liquid, thereby receiving more light rays emitted from the liquid and improving the detection sensitivity.

Of course, the orthographic projections of the optical detection structures onto the plane where the bottom of the channel is located, may also be located at two side of the center line of the bottom of the channel.

The microfluidic device further includes an upper substrate disposed opposite to the lower substrate. The at least two optical waveguides are between the upper substrate and the lower substrate. A size of the upper substrate is smaller than a size of the lower substrate with the liquid inlet region and the liquid outlet region of the channel being exposed out.

The size of the upper substrate may also be equal to the size of the lower substrate. Opening may be defined in the upper substrate at positions corresponding to the liquid inlet region and the liquid outlet region.

A refractive index of the material of the upper substrate and the lower substrate may be smaller than that of the first optical waveguide, thereby forming an optical waveguide structure. Or, a low refractive index material may be coated on surfaces of the upper substrate and the lower substrate. The channel may be filled with air or other materials of a low refractive index.

Optionally, the bottom surface of the channel may be treated by means of film coating or the like, and then is hydrophobic. Thus, when the liquid droplet flows in the channel, there is no residual liquid on the bottom, thereby improving liquid control sensitivity.

When the microfluidic device includes the upper substrate, a first electrode may be disposed on the surface of the lower substrate, and a second electrode may be disposed on a surface of the upper substrate. The first electrode and the second electrode are configured to form a driving electric field for controlling positions of the liquid in the accommodating chamber (which may be the above channel). The first electrode and the second electrode may be made of metal material, for example, metals such as Cu, Al, Ag, Mo, Cr, Nd, Ni, Mn, Ti, Ta, W, and an alloy of these metals, which may be a single-layer structure or multi-layer structure, such as Cu\Mo, Ti\Cu\Ti, Mo\Al\Mo. The second electrode may be a plate electrode covering an entire surface of the upper substrate. The first electrode may include a plurality of sub-electrodes. The sub-electrodes are corresponding to the positions of the optical detection structures in a one-to-one manner. The sub-electrode is located between the corresponding optical detection structure and the light coupling structure corresponding to the corresponding optical detection structure. A reference voltage may be applied to the second electrode, and a voltage of the sub-electrodes of the first electrode is controlled, thereby controlling the position of the liquid.

In one embodiment of the present disclosure, the microfluidic device may further include a light coupling-in structure. The light coupling-in structure is disposed at one side of the channel near the light incident region. The light coupling-in structure is used to couple incident light rays into the first optical waveguide, so that more light rays are incident into the first optical waveguide, and only few light rays are directly incident into the channel to form interference light, thereby improving the accuracy of detection.

Specifically, the light coupling-in structure may be a scattering hole or a grating disposed in the light incident region of the first optical waveguide. Scattering particles may filled in the scattering hole to increase scattering effect on light rays. The light coupling-in structure may be disposed in the light incident region and close to or distal to the lower substrate, or, may be disposed at a middle positon of the light incident region.

Of course, a laser or an optical fiber may be employed to directly irradiate the light incident region, or a coupling optical fiber may be fused to the light incident region of the first optical waveguide, or an LED/Micro-LED chip may be attached to the light incident region of the first optical waveguide. In this way, more light rays are incident into the first optical waveguide, and only few light rays are directly incident into the accommodating chamber to form interference light, thereby improving the accuracy of detection. The light coupling-in structure may also be a reflective inclination surface or a refractive inclination surface, which has a coupling efficiency greater than that of the gating and scattering means, and the like.

One embodiment of the present disclosure further provides a microfluidic detection system, including:
the above microfluidic device; and
a calculation circuit coupled to the optical detection structures of the microfluidic device and configured to calculate a parameter of the liquid in the accommodating chamber according to light rays acquired by the optical detection structures.

In the above microfluidic detection system, since the accommodating chamber of the microfluidic device can not only accommodate liquid but also has an optical waveguide structure, the position of the liquid changes the propagation of light rays in the optical waveguide structure, so that the light rays are emitted into the liquid. Then, the optical detection structures acquire light rays emitted from the liquid, so that the parameter of the liquid droplet can be accurately measured according to the acquired light rays, thereby achieving higher requirements for regulation.

The liquid parameter includes a position of the liquid, etc. The calculation circuit has data processing capabilities and/or program execution capabilities. The calculation circuit includes, but not limited to, one or more of devices such as a processor, a single chip microcomputer, a digital signal processing (DSP), and an application specific integrated circuit (ASIC). The processor may be, for example, a central processing unit (CPU), a field programmable gate array (FPGA), or a tensor processing unit (TPU). The calculation circuit may include one or more chips of the above devices.

The microfluidic detection system further includes a light source for providing required light rays to the microfluidic device. Specifically, the light rays emitted by the light source is incident into the first optical waveguide at the light incident region. The light source is disposed adjacent to the light incident region of the first optical waveguide.

One embodiment of the present disclosure further provides a method for driving the above microfluidic device. The method includes:
driving liquid to flow into the accommodating chamber;
controlling light rays to enter the first optical waveguide at an end of the first optical waveguide; where the light rays propagate towards another end of the first optical waveguide in a total reflection mode; when the light rays travel to a position corresponding to the liquid, at least some of the light rays emit from the first optical waveguide and are incident into the liquid; and
detecting light rays emitted from the liquid.

Optionally, the microfluidic device further includes an upper substrate disposed opposite to the lower substrate; a first electrode is disposed on a surface of the lower substrate, and a second electrode is disposed on a surface of the upper substrate; the method further includes: generating a driving electric field for controlling positions of the liquid in the accommodating chamber by applying voltages to the first electrode and the second electrode.

Optionally, positions of the liquid in the accommodating chamber may be controlled by using a microfluidic pump.

Specific examples of the present disclosure will be described in details hereinafter in conjunction with the drawings and embodiments. The following embodiments are intended to illustrate the present disclosure but are not intended to limit the scope of the present disclosure.

Referring to FIG. 1 to FIG. 5, one embodiment of the present disclosure provides a microfluidic device, which includes a cell defined by an upper substrate 100 and a lower substrate 200, and an optical waveguide disposed between the upper substrate 100 and the lower substrate 200. The upper substrate 100 and the lower substrate 200 each have a thickness of 0.1 mm to 2 mm.

Figure 7:
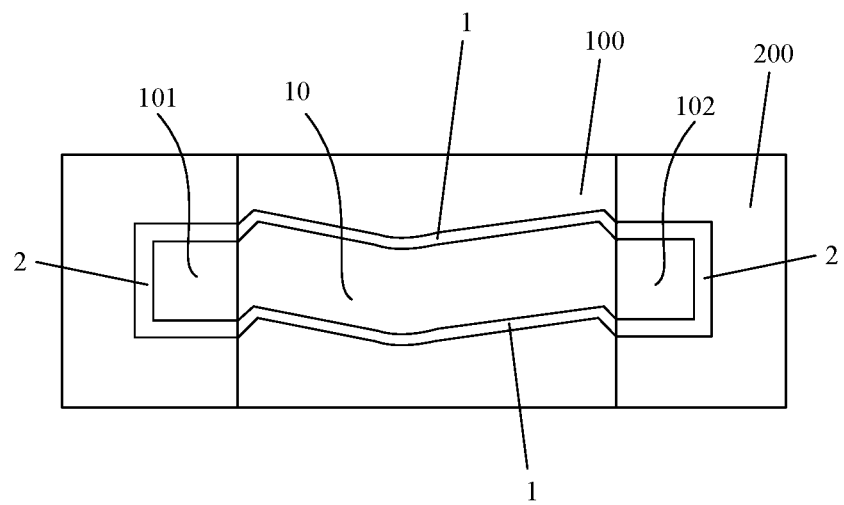
FIG. 7 is a second schematic view of a microfluidic device according to an embodiment of the present disclosure.
Figure 8:
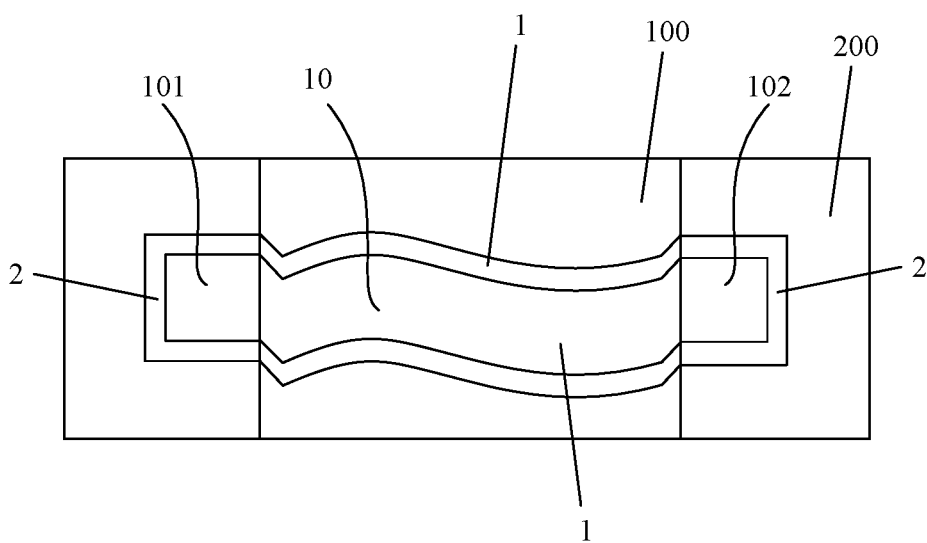
FIG. 8 is a third schematic view of a microfluidic device according to an embodiment of the present disclosure.

The optical waveguide includes two first optical waveguides 1 disposed opposite each other. The two first optical waveguides 1 each are a strip-shaped structure having a thickness of 1 micrometer to 1000 micrometers. An orthographic projection of the first optical waveguide 1 onto a plane where the lower substrate is, may be a straight line or a smooth curve. The shapes of the two first optical waveguides 1 are similar, and the first optical waveguides 1 are substantially parallel to each other, as shown in FIG. 1, FIG. 7 and FIG. 8. It should be noted that a shape of a channel defined between the first optical waveguides is not limited to shapes shown in FIG. 1, FIG. 7 and FIG. 8, and may be set according to specific application requirements.

A channel 10 is defined between the two first optical waveguides 1 on a surface of the lower substrate 200. The channel 10 can accommodate a liquid droplet 201. The first optical waveguide 1 is made of a high refractive index material having a refractive index of 1.6 to 4.0. For example, the first optical waveguide 1 is selected from materials such as resin material having a high refractive index (1.6 to 4.0), and Silicon on Insulator (SOI, in which a Si base substrate is taken as a substrate, SiO2 and a Si layer on SiO2 are used for preparing a microfluidic channel). The medium surrounding the first optical waveguide is made of a low refractive index material to keep light rays propagating in the first optical waveguide 1 in a total reflection manner. Specifically, the upper substrate 100 and the lower substrate 200 may be made of a low refractive index (1.1 to 1.5) material, or a low refractive index material may be coated on surfaces of the upper substrate 100 and the lower substrate 200 to form coated film layers each having a thickness of 1 um to 10 um. The channel 10 may be filled with air or other gas of a low refractive index, as long as the refractive index of the gas is smaller than the refractive index of the first optical waveguide 1.

Optionally, a bottom surface of the channel 10 may be treated by means of film coating or the like, and then is hydrophobic. Thus, when the liquid droplet 201 flows in the channel 10, there is no residual liquid, thereby reducing interference light and improving detection sensitivity.

The waveguide further includes two second optical waveguides 2 disposed between the two first optical waveguides 1. One of the two second optical waveguides 2 is located at one end of the channel 10 and the other of the two second optical waveguides 2 is located at the other end of the channel 10. The two second optical waveguides 2 may be integrally formed with the first optical waveguides 1 to seal both ends of the channel 10, thereby forming a sealed accommodating chamber.

A liquid inlet region 101 is defined at one end of the channel 10, and liquid outlet region 102 is defined at an opposite end of the channel 10. The liquid inlet region 101 enables the liquid droplet 201 to flow into the channel 10. The liquid outlet region 102 enables the liquid droplet 201 to flow out of the channel 10. In order to facilitate the liquid droplet 201 to flow into the channel 10, a size of the upper substrate 100 is set to be smaller than a size of the lower substrate 200, thereby enabling the liquid inlet region 101 and the liquid outlet region 102 to be exposed out. Further, a width of each of the liquid inlet region 101 and the liquid outlet region 102 is greater than a width of other sections of the channel 10, thereby facilitating injection of the liquid. Since the channel 10 is surrounded by the two first optical waveguides 1 on the surface of the lower substrate 200, a distance between the two first optical waveguides 1 at both ends of the two first optical waveguides 1 is greater than that of other sections, thereby forming the liquid inlet region 101 and the liquid outlet region 102.

The size of the upper substrate 100 may also be set to be equal to the size of the lower substrate 200, and opening may be defined in the upper substrate at positions corresponding to the liquid inlet region and the liquid outlet region.

One end of the first optical waveguide 1 has a light incident region, and the other opposite end of the first optical waveguide 1 has a light exiting region. Light rays enter the first optical waveguide 1 at the light incident region, and propagate in a direction towards the light exiting region in total reflection mode in the first optical waveguide 1, that is, light rays travel from one end of the first optical waveguide 1 to the other end of the first optical waveguide 1.

Figure 4:
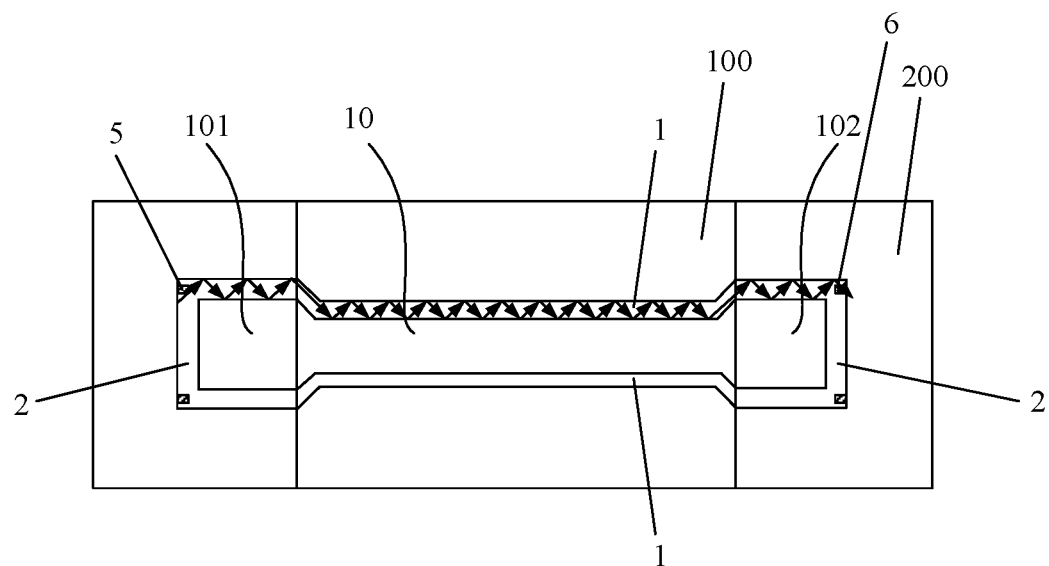
FIG. 4 is a first schematic view of optical paths when there is no liquid in an accommodating chamber of the microfluidic device according to an embodiment of the present disclosure.
Figure 5:
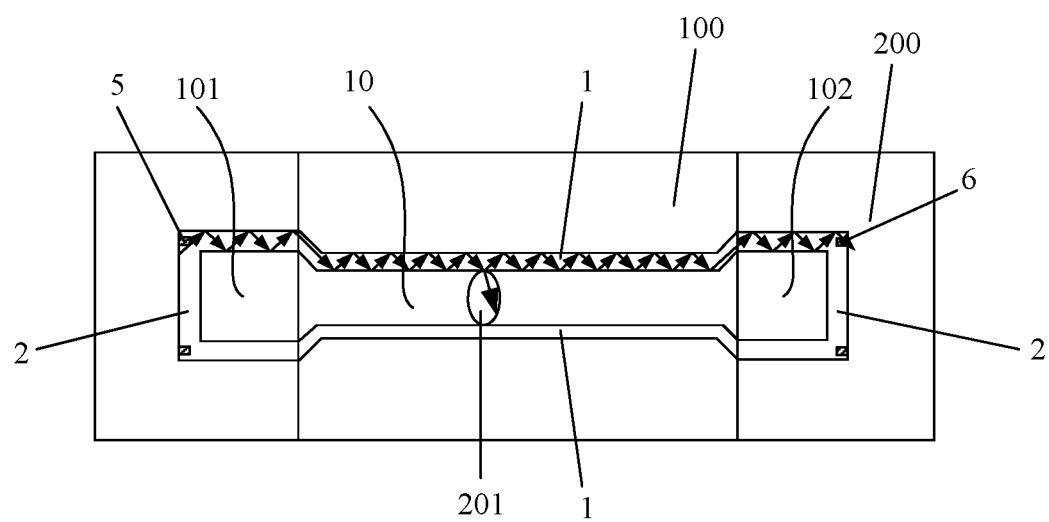
FIG. 5 is a first schematic view of optical paths when there is liquid in the accommodating chamber of the microfluidic device according to an embodiment of the present disclosure.
Figure 6:
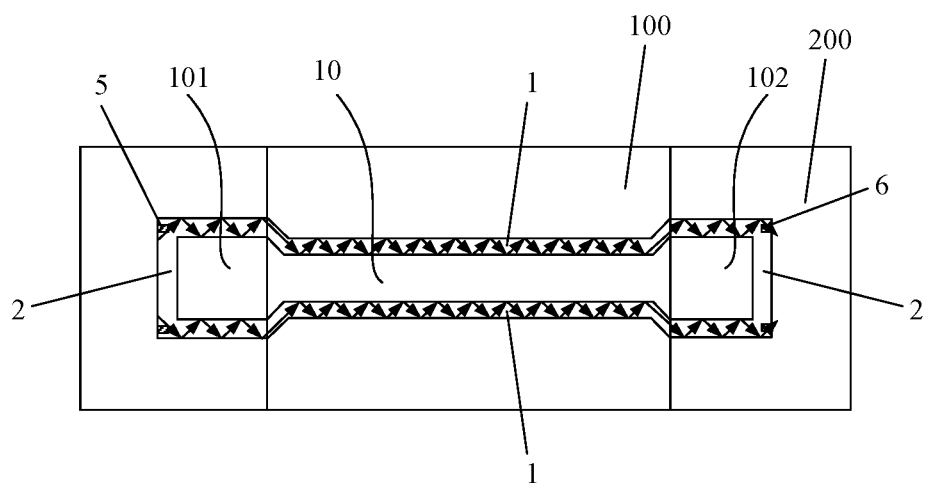
FIG. 6 is a second schematic view of optical paths when there is no liquid in an accommodating chamber of the microfluidic device according to an embodiment of the present disclosure.

As shown in FIG. 4, the light rays may enter only one of the first optical waveguides 1; or, as shown in FIG. 6, the light rays may simultaneously enter the two first optical waveguides 1. When the light rays simultaneously enter the two first optical waveguides 1, an intensity of light rays incident on the liquid in the channel 10 is increased, thereby improving the detection sensitivity of the liquid droplet 201.

A plurality of optical detection structures 3 is disposed on the lower substrate 200, and is used to detect light rays emitted from the liquid. Orthographic projections of the optical detection structures 3 onto a plane where a bottom of the channel 10 is located, may be located on a center line of the bottom of the channel 10, and is substantially corresponding to a center of the liquid droplet 201, so that more light rays emitted from the liquid droplet 201 can be received, thereby improving detection sensitivity. The optical detection structure may be a CMOS or a photodiode, and the optical detection structures 3 may be arranged at equal intervals.

Of course, orthographic projections of the optical detection structures onto the plane where the bottom of the channel is located, may also be located at two side of the center line of the bottom of the channel 10.

A plurality of light coupling structures 4 may also be disposed on the surface of the lower substrate 200. The optical detection structure 3 is located at one side of the light coupling structure 4 distal to the optical waveguide. The light coupling structures 4 are corresponding to the optical detection structures 3 in a one-to-one. The light coupling structures 4 are used to couple light rays emitted from the liquid droplet 201 to the corresponding optical detection structures 3, thereby increasing light rays projected to the optical detection structures 3 and then improving the detection sensitivity. A distance between two adjacent optical detection structures 3 depends on an accuracy of a light-emitting direction of the light coupling structure 4 and a signal-to-noise ratio requirement of the optical detection structure 3. It is better that two adjacent optical detection structures 3 are closely arranged (a buffer film layer or the like may be interposed therebetween).

In this embodiment, a groove is defined in the surface of the lower substrate 200. The light coupling structure 4 and the optical detection structure 3 are disposed in the groove, so that the bottom of the channel 10 can provide a flat surface, which facilitates the liquid droplet 201 to flow within the channel 10. The light coupling structure 4 may be a grating or scattering particles filled in the groove. When the scattering particles are filled, the process is simple. When the gating is provided, it is more precise in controlling angles of light rays with less interference light. A suitable light coupling structure may be selected according to specific needs.

In order to improve the detection sensitivity and reduce the interference light, the microfluidic device further includes a light coupling-in structure 5. The light coupling-in structure 5 is disposed at one side of the channel 10 near the light incident region. The light coupling-in structure 5 is used to couple incident light rays into the first optical waveguide 1, so that more light rays are incident into the first optical waveguide 1, and only few light rays are directly incident into the channel 10 to form interference light, thereby improving the accuracy of detection.

Specifically, the light coupling-in structure 5 may be a scattering hole or a grating disposed in the light incident region of the first optical waveguide 1. Scattering particles may filled in the scattering hole to increase scattering effect on light rays. The light coupling-in structure 5 may be disposed in the light incident region and close to or distal to the lower substrate 200, or, may be disposed at a middle positon of the light incident region.

Of course, a laser or an optical fiber may be employed to directly irradiate the light incident region, or a coupling optical fiber may be fused to the light incident region of the first optical waveguide, or an LED/Micro-LED chip may be attached to the light incident region of the first optical waveguide. In this way, more light rays are incident into the first optical waveguide, and only few light rays are directly incident into the accommodating chamber to form interference light, thereby improving the accuracy of detection.

Similarly, in order to enable light rays to be emitted toward the light exiting region at the other end of the channel with few interference light, the microfluidic device further includes a light coupling-out structure 6. The light coupling-out structure 6 is disposed at one side of the channel adjacent the light exiting region, and is configured to couple light rays emitted from the first optical waveguide into the light exiting region, thereby preventing emitted light rays from entering the channel again to form interference light and then improving the accuracy of the detection.

In this embodiment, a first electrode may be disposed on the lower substrate 200, and a second electrode 8 may be disposed on the upper substrate 100. The first electrode and the second electrode 8 are configured to form a driving electric field for controlling positions of the liquid droplet 201 in the channel 10. The first electrode and the second electrode 8 may be made of metal material, for example, metals such as Cu, Al, Ag, Mo, Cr, Nd, Ni, Mn, Ti, Ta, W, and an alloy of these metals, which may be a single-layer structure or multi-layer structure, such as Cu\Mo, Ti\Cu\Ti, Mo\Al\Mo. The second electrode 8 may be a plate electrode covering an entire surface of the upper substrate 100. The first electrode may include a plurality of sub-electrodes 7. The sub-electrodes 7 are corresponds to the positions of the optical detection structures 3 in a one-to-one manner. The sub-electrode 7 is located between the corresponding optical detection structure 3 and the light coupling structure 4 corresponding to the corresponding optical detection structure 3. A reference voltage may be applied to the second electrode 8, and a voltage may be applied to the sub-electrode 7 under control of a switch, thereby controlling the position of the liquid droplet according to the principle of electrowetting.

In practical applications, droplets may also be pumped from a liquid inlet region into the channel by a microfluidic pump. This applies to the case where the liquid is a liquid column or a liquid droplet.

Referring to FIG. 1 to FIG. 5, in the embodiment, the microfluidic device specifically includes:

a cell defined by an upper substrate 100 and a lower substrate 200; where the upper substrate 100 and the lower substrate 200 may be made of transparent material such as glass and resin, or other materials such as metal, Si, and Silicon on Insulator (SOI), the materials of the upper substrate 100 and the lower substrate 200 may be different or the same, and the upper substrate 100 and the lower substrate 200 each have a thickness of 0.1 mm to 2 mm;

a first electrode disposed on the lower substrate 200; where the first electrode may include a plurality of sub-electrodes 7, the sub-electrodes 7 are corresponds to positions of optical detection structures 3 in a one-to-one manner, each sub-electrode 7 is located between the corresponding optical detection structure 3 and a light coupling structure 4 corresponding to the corresponding optical detection structure 3, and the sub-electrodes 7 and the second electrode 8 are configured to form a driving electric field for controlling flowing of a liquid droplet 201 in a channel 10 and controlling positions of the liquid droplet 201 in the channel 10;

an optical waveguide disposed between the upper substrate 100 and the lower substrate 200; where the optical waveguide includes two first optical waveguides 1 disposed opposite each other, the channel 10 is defined between the two first optical waveguides 1 on a surface of the lower substrate 200, the channel 10 can accommodate the liquid droplet 201, a bottom surface of the channel 10 may be treated by means of film coating or the like and then is hydrophobic; the waveguide further includes two second optical waveguides 2 disposed between the two first optical waveguides 1, one of the two second optical waveguides 2 is located at one end of the channel 10 and the other of the two second optical waveguides 2 is located at the other end of the channel 10, the two second optical waveguides 2 may be integrally formed with the first optical waveguides 1 to seal both ends of the channel 10 thereby forming an accommodating chamber; a liquid inlet region 101 is defined in one end of the channel 10, and a liquid outlet region 102 is defined in an opposite end of the channel 10; the liquid inlet region 101 enables the liquid droplet 201 to flow into the channel 10; the liquid outlet region 102 enables the liquid droplet 201 to flow out of the channel 10; a size of the upper substrate 100 is smaller than a size of the lower substrate 200, thereby enabling the liquid inlet region 101 and the liquid outlet region 102 to be exposed out; one end of the first optical waveguide 1 has a light incident region, and the other opposite end of the first optical waveguide 1 has a light exiting region; the light incident region is located at one side of the channel 10 adjacent the liquid inlet region 101; the light exiting region is located at another side of the channel 10 adjacent the liquid outlet region 102; light rays entering the first optical waveguide 1 at the light incident region propagate in a direction towards the light exiting region in total reflection mode in the first optical waveguide 1;

a plurality of grooves defined in a bottom of the channel 10;

a plurality of optical detection structures 3 disposed in the grooves in a one-to-one manner and configured to detect light rays emitted from the liquid droplet 201; orthographic projections of the optical detection structures 3 onto a plane where the bottom of the channel 10 is located, may be located on a center line of the bottom of the channel 10;

a plurality of light coupling structures 4; where the light coupling structure 4 includes scattering particles filled in the groove and covering the optical detection structure 3 in the groove; the light coupling structures 4 are used to couple light rays emitted from the liquid droplet 201 to the corresponding optical detection structure 3;

a light coupling-in structure 5; where the light coupling-in structure 5 is disposed at a middle of the light incident region of the first optical waveguide 1; the light coupling-in structure 5 is a scattering hole disposed in the light incident region of the first optical waveguide 1, and the scattering hole is filled with scattering particles; and a light coupling-out structure 6 disposed at a middle of the light exiting region of the first optical waveguide 1; where the light coupling-out structure is scattering hole disposed in the light exiting region of the first optical waveguide 1, and the scattering hole is filled with scattering particles.

Figure 10:
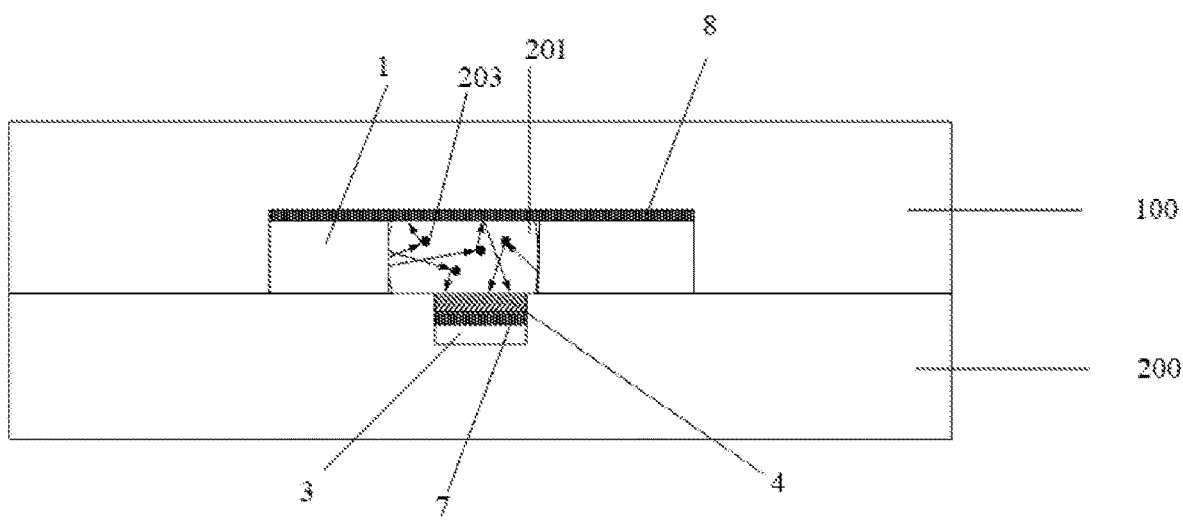
FIG. 10 is a schematic cross-sectional view of a microfluidic device according to an embodiment of the present disclosure.

The above microfluidic device controls liquid parameters of the liquid droplet such as a position of the liquid droplet in the channel by an electric field. One sidewall (i.e., the first optical waveguide) defining the channel is made of high refractive index material, thereby forming an optical waveguide structure. Light rays propagate in the first optical waveguide in a total reflection mode. When there is a liquid droplet in the channel, light rays are no longer totally reflected at a position corresponding to the liquid droplet in the first optical waveguide, and some of the light rays enters the liquid droplet. The light rays entering the liquid droplet are scattered (for example, scattered by scattering particles 203) by the liquid droplet and then emitted around (as shown in FIG. 10). The optical detection structures 3 disposed on the bottom of the groove in the substrate 200 can detect light rays emitted from the liquid droplet and accurately measure liquid parameters of the liquid droplet, thereby achieving higher requirements for regulation. When the liquid itself has scattering effect, the light coupling structures 4 may be omitted.

In some embodiments, by providing the light coupling-in structure at a first side of the first optical waveguide 1 adjacent the light incident region and providing the light coupling-out structure at a second side of the first optical waveguide 1 adjacent light exiting region, it can reduce light rays that directly enter the channel to form interference light, thereby improving the accuracy and sensitivity of detection.

One embodiment of the present disclosure further provides a microfluidic detection system including:

the above microfluidic device;

a light source, from which light rays emitted, are incident into the first optical waveguide 1 through the light incident region; and a calculation circuit coupled to the optical detection structures of the microfluidic device and configured to calculate a liquid parameter of the liquid in the channel according to light rays acquired by the optical detection structures.

In some embodiments, the calculation circuit is further configured to determine whether there is a liquid droplet in the accommodating chamber according to the light rays acquired by the optical detection structures; when there is a liquid droplet in the accommodating chamber, calculate the liquid parameter of the liquid in the channel according to light rays acquired by the optical detection structures.

In the above microfluidic detection system, since the channel of the microfluidic device can not only accommodate liquid but also has an optical waveguide structure, the position of the liquid changes the propagation of light rays in the optical waveguide structure, so that the light rays are emitted into the liquid. Then, the optical detection structures acquire light rays emitted from the liquid, so that the liquid parameter of the liquid droplet can be accurately measured according to the acquired light rays, thereby achieving higher requirements for regulation.

Figure 9:
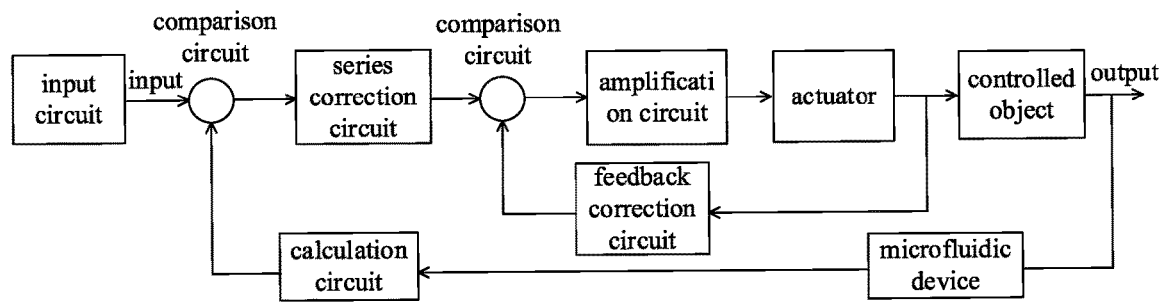
FIG. 9 is a block diagram of a microfluidic detection system according to an embodiment of the present disclosure.

In some embodiments, as shown in FIG. 9, the microfluidic detection system in this embodiment adopts a feedback closed loop control manner, which specifically includes:

an input circuit configured to provide a preset liquid parameter;

a comparison circuit configured to calculate a deviation between the preset liquid parameter and an actual liquid parameter calculated by the calculation circuit; where the comparison circuit may employ an integrated operational amplifier circuit (referred to as an integrated operational amplifier);

an amplification circuit including a voltage amplification module and a power amplification module, and configured to amplify the deviation which is usually too smaller to drive loads;

an actuator directly driving a controlled object (microfluidic device) to change the output; where the actuator may employ a microfluidic pump or a driver chip for applying a voltage to the electrodes (to generate a driving electric field for controlling liquid parameters of the liquid droplet);

a microfluidic device configured to detect light rays emitted from a liquid;

a calculation circuit configured to calculate a controlled object (such as a position of the liquid droplet) according to the light rays detected by the microfluidic device, and convert the controlled object into a digital or analog signal corresponding to the controlled object (such as a position of the liquid droplet or liquid in a microfluidic chip);

a correction circuit or a compensation circuit, which enables structures and parameters easy to be adjusted, is connected to the system in series or in feedback for completing required calculation functions to improve system performance. Depending on different locations of the correction circuit in the system, it may be referred to as a series correction circuit or a feedback correction circuit.

By combining the above microfluidic detection system with the corresponding microfluidic device (such as microfluidic pump driver, electrowetting-based driver chip), using a specific control algorithm (or chip), accurate measurement and controlling of the liquid in the microfluidic device can be achieved.

In addition, in some embodiments, in a cross-section perpendicular to a length direction of the channel 10, the liquid droplet may fill up the channel 10. In this way, in the cross-section perpendicular to the length direction of the channel 10, the liquid droplet is in full contact with the two optical waveguides, so that the liquid parameters of the liquid can be more accurately calculated according to different intensities of light rays emitted at different positions of the liquid droplet. In addition, when the liquid flows continuously in channel 10 and fills up the whole channel, the concentrations of different liquids can be determined according to different scattering conditions, such as different scattering spectra based on spectral analysis. For example, a concentration of protein in milk, a concentration of micro particles in blood and the like may be determined.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A microfluidic device, comprising:
   a substrate;
   two first optical waveguides disposed opposite each other on the substrate, with an accommodating chamber defined between the two first optical waveguides;
   wherein the accommodating chamber is a channel defined by the two first optical waveguides on the substrate; and
   a plurality of optical detection structures in the accommodating chamber;
   wherein the first optical waveguide has a refractive index greater than a refractive index of a medium surrounding the first optical waveguide, thereby enabling light rays incident into an end of the first optical waveguide to propagate towards another end of the first optical waveguide in a total reflection mode;
   wherein each optical detection structure is a Complementary Metal Oxide Semiconductor (CMOS) or a photodiode, a plurality of grooves is defined in a surface of the substrate in the channel, the plurality of optical detection structures are disposed in the plurality of grooves in a one-to-one manner, and orthographic projections of the optical detection structures onto a plane where the bottom of the channel is located are located on a center line of the bottom of the channel.

2. The microfluidic device according to claim 1, wherein the microfluidic device further includes a plurality of light coupling structures which are disposed in the plurality of grooves and corresponding to the plurality of optical detection structures in a one-to-one manner; and the optical detection structure is located at one side of the light coupling structure corresponding to the optical detection structure distal to the first optical waveguide.

3. The microfluidic device according to claim 2, wherein the light coupling structure is a grating or scattering particles in the groove.

4. The microfluidic device according to claim 1, wherein; the end of the first optical waveguide is a liquid inlet region of the channel; and the another end of the first optical waveguide is a liquid outlet region of the channel.

5. The microfluidic device according to claim 4, wherein the two first optical waveguides each are a strip-shaped structure and are parallel to each other.

6. The microfluidic device according to claim 4, wherein the channel has a bottom; and orthographic projections of the plurality of optical detection structures onto a plane where the bottom is located, are arranged along a center line of the bottom.

7. The microfluidic device according to claim 4, wherein the microfluidic device further includes a light coupling-in structure; and the light coupling-in structure is disposed at the end of the first optical waveguide and configured to couple incident light rays into the first optical waveguide.

8. The microfluidic device according to claim 7, wherein the light coupling-in structure is a scattering hole or a grating disposed in the end of the first optical waveguide.

9. The microfluidic device according to claim 1, wherein the microfluidic device further includes another substrate disposed opposite to the substrate, the two first optical waveguides are between the substrate and the another substrate; and
a size of the another substrate is smaller than a size of the substrate with the end and the another end of the first optical waveguide being exposed out.

10. The microfluidic device according to claim 9, wherein a first electrode is disposed on a surface of the substrate, and a second electrode is disposed on a surface of the another substrate;
the first electrode includes a plurality of sub-electrodes, the plurality of sub-electrodes are corresponding to positions of the plurality of optical detection structures in a one-to-one manner; and the sub-electrode is located between the optical detection structure corresponding to the sub-electrode and the light coupling structure corresponding to the optical detection structure which is corresponding to the sub-electrode.

11. The microfluidic device according to claim 1, wherein the microfluidic device further includes two second optical waveguides disposed between the two first optical waveguides, one of the two second optical waveguides is located at one end of the channel and the other of the two second optical waveguides is located at the other end of the channel; the two second optical waveguides are integrally formed with the first optical waveguides thereby forming the accommodating chamber.

12. A microfluidic detection system comprising:
the microfluidic device according to claim 1; and
a calculation circuit coupled to the optical detection structures of the microfluidic device and configured to calculate a liquid parameter of liquid in the accommodating chamber according to light rays acquired by the optical detection structures.

13. The microfluidic detection system according to claim 12, further comprising: a light source disposed at an end of the first optical waveguide of the microfluidic device.

14. A method for driving the microfluidic device according to claim 1, comprising:
driving liquid to flow into the accommodating chamber;
controlling light rays to enter the first optical waveguide at an end of the first optical waveguide; wherein the light rays propagate towards another end of the first optical waveguide in a total reflection mode; when the light rays travel to a position corresponding to the liquid, at least some of the light rays emit from the first optical waveguide and are incident into the liquid; and
detecting light rays emitted from the liquid.

15. The method according to claim 14, wherein the microfluidic device further includes another substrate disposed opposite to the substrate; a first electrode is disposed on a surface of the substrate, and a second electrode is disposed on a surface of the another substrate; the method includes:
generating a driving electric field for controlling positions of the liquid in the accommodating chamber by applying voltages to the first electrode and the second electrode.

16. The method according to claim 14, further comprising: controlling positions of the liquid in the accommodating chamber by using a microfluidic pump.

* * * * *